United States Patent
Webber et al.

(10) Patent No.: US 8,650,621 B2
(45) Date of Patent: Feb. 11, 2014

(54) SYSTEM AND METHOD FOR VERIFYING THE AGE OF AN INTERNET USER

(75) Inventors: Jo Webber, Philadelphia, PA (US); Pradeep Ittycheria, Philadelphia, PA (US)

(73) Assignee: Virtual Piggy, Inc., Philadelphia, PA (US)

( * ) Notice: Subject to any disclaimer, the term of this patent is extended or adjusted under 35 U.S.C. 154(b) by 0 days.

(21) Appl. No.: 12/991,063

(22) PCT Filed: Sep. 3, 2010

(86) PCT No.: PCT/US2010/047796
§ 371 (c)(1),
(2), (4) Date: Apr. 8, 2011

(87) PCT Pub. No.: WO2011/028992
PCT Pub. Date: Mar. 10, 2011

(65) Prior Publication Data
US 2011/0185400 A1    Jul. 28, 2011

Related U.S. Application Data

(60) Provisional application No. 61/272,235, filed on Sep. 3, 2009, provisional application No. 61/272,233, filed on Sep. 3, 2009, provisional application No. 61/272,232, filed on Sep. 3, 2009, provisional application No. 61/272,234, filed on Sep. 3, 2009.

(51) Int. Cl.
*G06F 15/173*    (2006.01)

(52) U.S. Cl.
USPC .................................. 726/4; 709/225; 705/31

(58) Field of Classification Search
USPC ............................................................ 726/4
See application file for complete search history.

(56) References Cited

U.S. PATENT DOCUMENTS

| | | | |
|---|---|---|---|
| 5,262,943 A * | 11/1993 | Thibado et al. | ............... 600/300 |
| 6,173,269 B1 | 1/2001 | Soloki et al. | |
| 6,397,256 B1 | 5/2002 | Chan et al. | |
| 6,785,824 B1 | 8/2004 | Grassle | |
| 7,171,382 B2 | 1/2007 | Beacham | |
| 7,171,392 B2 | 1/2007 | Brookner et al. | |
| 7,302,272 B2 | 11/2007 | Ackley | |

(Continued)

FOREIGN PATENT DOCUMENTS

| | | |
|---|---|---|
| JP | 2006-526327 A | 11/2006 |
| JP | 2007-510979 A | 4/2007 |

(Continued)

OTHER PUBLICATIONS

Notification of Transmittal of Search Report and Written Opinion of the International Searching Authority from the PCT dated Oct. 29, 2012 in a counterpart PCT application.

(Continued)

*Primary Examiner* — Andrew Goldberg
(74) *Attorney, Agent, or Firm* — Morgan, Lewis & Bockius LLP

(57) ABSTRACT

A method of verifying the age of a prospective Internet user comprises establishing an age check account; receiving information about a user, the information including an alleged age of the user; sending the information to be verified; and receiving a notification that the information has been verified.

10 Claims, 4 Drawing Sheets

(56) References Cited

U.S. PATENT DOCUMENTS

| | | | |
|---|---|---|---|
| 7,562,387 B2 | 7/2009 | Nguyen et al. | |
| 7,734,779 B1* | 6/2010 | Piccionelli | 709/225 |
| 7,828,652 B2* | 11/2010 | Nguyen et al. | 463/29 |
| 7,945,512 B2 | 5/2011 | Scipioni et al. | |
| 8,116,726 B2 | 2/2012 | Richardson et al. | |
| 8,127,982 B1 | 3/2012 | Casey et al. | |
| 8,132,212 B2 | 3/2012 | Huegel | |
| 8,249,986 B2 | 8/2012 | Scipioni et al. | |
| 8,312,484 B1 | 11/2012 | McCarty et al. | |
| 2002/0049806 A1 | 4/2002 | Gatz et al. | |
| 2002/0055911 A1 | 5/2002 | Guerreri | |
| 2002/0074397 A1 | 6/2002 | Matthews | |
| 2002/0120866 A1 | 8/2002 | Mitchell et al. | |
| 2003/0088490 A1 | 5/2003 | Beacham | |
| 2003/0154138 A1* | 8/2003 | Phillips et al. | 705/26 |
| 2003/0204445 A1 | 10/2003 | Vishik et al. | |
| 2003/0233296 A1* | 12/2003 | Wagner | 705/31 |
| 2004/0153421 A1* | 8/2004 | Robinson | 705/75 |
| 2004/0215534 A1 | 10/2004 | Gautier et al. | |
| 2005/0038744 A1 | 2/2005 | Viijoen | |
| 2005/0039053 A1* | 2/2005 | Walia | 713/201 |
| 2005/0044181 A1 | 2/2005 | Lee | |
| 2005/0076367 A1 | 4/2005 | Johnson et al. | |
| 2005/0102407 A1 | 5/2005 | Clapper | |
| 2006/0069627 A1 | 3/2006 | Petersen et al. | |
| 2006/0161593 A1 | 7/2006 | Mori et al. | |
| 2006/0161669 A1 | 7/2006 | Mathew et al. | |
| 2006/0173792 A1 | 8/2006 | Glass | |
| 2006/0259778 A1 | 11/2006 | Gudorf et al. | |
| 2007/0118475 A1 | 5/2007 | Picciallo et al. | |
| 2007/0203954 A1* | 8/2007 | Vargas et al. | 707/201 |
| 2007/0220494 A1 | 9/2007 | Spooner | |
| 2007/0245152 A1* | 10/2007 | Pizano et al. | 713/186 |
| 2007/0250392 A1* | 10/2007 | Paulsen et al. | 705/19 |
| 2007/0260603 A1 | 11/2007 | Tuscano et al. | |
| 2008/0004984 A1 | 1/2008 | Sendo et al. | |
| 2008/0033740 A1 | 2/2008 | Cahn et al. | |
| 2008/0148362 A1 | 6/2008 | Gilder et al. | |
| 2008/0168548 A1 | 7/2008 | O'Brien | |
| 2008/0228615 A1 | 9/2008 | Scipioni et al. | |
| 2008/0228637 A1 | 9/2008 | Scipioni et al. | |
| 2008/0228638 A1 | 9/2008 | Scipioni et al. | |
| 2009/0043747 A1* | 2/2009 | Smith et al. | 707/4 |
| 2009/0064302 A1 | 3/2009 | Colella | |
| 2009/0112763 A1 | 4/2009 | Scipioni et al. | |
| 2009/0235086 A1* | 9/2009 | Lai et al. | 713/186 |
| 2009/0281937 A1 | 11/2009 | Gupta et al. | |
| 2009/0299841 A1 | 12/2009 | Bishop et al. | |
| 2010/0042912 A1 | 2/2010 | Whitaker | |
| 2010/0114733 A1 | 5/2010 | Collas et al. | |
| 2010/0223184 A1 | 9/2010 | Perlman | |
| 2011/0010293 A1 | 1/2011 | Giordano et al. | |
| 2011/0047629 A1* | 2/2011 | Mitchell et al. | 726/28 |
| 2011/0184855 A1 | 7/2011 | Webber et al. | |
| 2011/0185399 A1 | 7/2011 | Webber et al. | |
| 2011/0185400 A1 | 7/2011 | Webber et al. | |
| 2011/0237222 A1 | 9/2011 | Niejadlik | |
| 2012/0005582 A1 | 1/2012 | Webber et al. | |
| 2012/0171990 A1 | 7/2012 | Williams et al. | |
| 2012/0209768 A1 | 8/2012 | Nuzzi | |
| 2012/0209772 A1 | 8/2012 | Nuzzi et al. | |
| 2012/0259768 A1 | 10/2012 | Mukherjee | |
| 2012/0278202 A1 | 11/2012 | Webber et al. | |
| 2012/0278233 A1 | 11/2012 | Webber et al. | |
| 2012/0303523 A1 | 11/2012 | Webber et al. | |
| 2013/0018792 A1 | 1/2013 | Casey et al. | |
| 2013/0080323 A1 | 3/2013 | Scipioni | |
| 2013/0110670 A1 | 5/2013 | Webber et al. | |
| 2013/0110716 A1 | 5/2013 | Rekhi et al. | |

FOREIGN PATENT DOCUMENTS

| | | |
|---|---|---|
| KR | 10-2002-0021515 A | 3/2002 |
| KR | 10-0374296 B1 | 2/2003 |
| KR | 10-2003-0066494 | 8/2003 |
| KR | 10-2006-0103363 A | 9/2006 |
| KR | 10-2008-0009175 A | 1/2008 |
| KR | 10-2003-0066494 A | 10/2012 |
| KR | 10-2008-0009175 A | 10/2012 |
| WO | 00/36570 A1 | 6/2000 |
| WO | 2004/089006 A2 | 10/2004 |
| WO | 2008/101312 A1 | 8/2008 |
| WO | 2011/028985 A2 | 3/2011 |
| WO | 2011/028989 A2 | 3/2011 |
| WO | 2011/028991 A2 | 3/2011 |
| WO | 2011/028992 A2 | 3/2011 |

OTHER PUBLICATIONS

Notification of Transmittal of Search Report and Written Opinion of the International Searching Authority from the PCT dated Oct. 4, 2012 in a counterpart PCT application.
U.S. Office Action for U.S. Appl. No. 12/991,053, dated Sep. 19, 2013.
International Search Report (PCT/US2012/033022), Oct. 4, 2012.
International Search Report (PCT/US2012/033002), Oct. 29, 2012.
International Search Report (PCT/US2012/032998), Oct. 31, 2012.
International Search Report (PCT/US2010/047794), May 24, 2011.
International Search Report (PCT/US2010/047796), May 2, 2011.
IGN Staff (E3 2002: All About Xbox Live, Full Blowout on Microsoft's Online Service Including Price, Launch Titles, and More, May 20, 2002).
International Search Report (PCT/US2010/047785), Apr. 29, 2011.
Written Opinion (PCT/US2010/047785), Apr. 29, 2011.
International Preliminary Report on Patentability (PCT/US2010/047785), Mar. 6, 2012.
International Search Report (PCT/US2010/047790), Jun. 8, 2011.
Written Opinion (PCT/US2010/047790), Jun. 8, 2011.
International Preliminary Report on Patentability (PCT/US2010/047790), Mar. 6, 2012.
Written Opinion (PCT/US2010/047794), May 24, 2011.
International Preliminary Report on Patentability (PCT/US2010/047794), Mar. 6, 2012.
Written Opinion (PCT/US2010/047796), May 2, 2011.
International Preliminary Report on Patentability (PCT/US2010/047796), Mar. 6, 2012.
U.S. Office Action for U.S. Appl. No. 13/567,610, dated Oct. 11, 2013.

* cited by examiner

SYSTEM AND METHOD FOR VERIFYING THE AGE OF AN INTERNET USER

This application claims the priority and benefit of U.S. Provisional Patent Application No. 61/272,233, U.S. Provisional Patent Application No. 61/272,235, U.S. Provisional Patent Application No. 61/272,234, and U.S. Provisional Patent Application No. 61/272,232, all of which were filed on Sep. 3, 2009 and are incorporated herein by reference.

CROSS-REFERENCE TO RELATED APPLICATIONS

This application is related to U.S. patent application Ser. No. 12/991,053, which claims the priority and benefit of U.S. Provisional Patent Application No. 61/272,233, which was filed on Sep. 3, 2009, and is incorporated herein by reference.

This application is related to U.S. patent application Ser. No. 12/991,059, which claims the priority and benefit of U.S. Provisional Patent Application No. 61/272,232, which was filed on Sep. 3, 2009, and is incorporated herein by reference.

This application is related to U.S. patent application Ser. No. 12/991,057, which claims the priority and benefit of U.S. Provisional Patent Application No. 61/272,234, which was filed on Sep. 3, 2009, and is incorporated herein by reference.

BACKGROUND OF THE INVENTION

1. Field of the Invention

The present invention relates to a system and method for age verification, and more particularly to a system and method for verifying the age of an Internet user to insure that the user seeking to gain access to an Internet application is at least of the age appropriate.

2. Discussion of the Related Art

Children today have never known a world without the Internet. Children see their friends interacting and playing online and there is ever-increasing pressure on parents from their children to allow the children to be online. In numerous instances, children are not protected by media companies and are being placed in extreme danger posed by online predators. Until measures are taken to provide a secure online environment for younger age groups, the online safety of children is compromised.

Generally, parental control systems fall under one of two categories. First, active parental control systems prevent a child from accessing information that the parent does not want them to access. For example, active parental control systems include programs such as hardware and software firewalls as well as hardware access controls tools or systems that prevent certain types of data from being presented to a user. Second, passive parental control systems allow parents to audit information that their children have been accessing and activities that their children engaged in while they were online, on a computer system, or on a managed or unmanaged network. For example, passive parental control systems include systems that audit user access and activity information in managed and unmanaged networks and present this information to parents.

With the increased penetration of the Internet, parents are more interested in knowing what their children are doing when they use a computer, including the websites they visit and the individuals with whom they are communicating. While active and passive controls help parents manage and control some of this information, there are no provisions for parents to control the types of services their children may sign up for on the Internet. Sign-up is a common step with Internet based applications. The sign-up process allows users to register for services provided by Internet based applications.

Active and passive parental control systems do not provide any support for being able to communicate and enforce parental preferences when it comes to sign-up of services on web-based and Internet enabled desktop applications. Broad classifications, such as Entertainment Software Rating Board ("ESRB") ratings, do not provide parents with the level of control they would like with respect to sign-up preferences for the children.

Using the Internet has become extremely easy, and one aspect of this ease is that children of very young ages are able to gain access to Internet websites of all kinds. Juxtaposed with this ease is the Children's Online Privacy Protection Act (COPPA), which lays out specific guidelines for how website operators and online businesses must interact with children 13 year old and younger. In general, COPPA requires parental notification and consent prior to an online operator's collecting, using or disclosing a child's personal information. COPPA does make provisions for accounts for children under 13 with certain conditions, including parental consent, being imposed on the users. Compliance with COPPA can be daunting for an online business. While some online businesses are taking steps to comply with COPPA, many of the new media companies, including Facebook are choosing to avoid COPPA compliance by restricting their sites to over 13's and foregoing a significant business opportunity in interacting with the under 13 market segment. Moreover, it has become increasingly difficult to determine if a person is telling the truth when he or she enters their age or date of birth to gain access to a website. Thus, a system is needed that will enable an online service provider to accurately determine the age of a user before the user is allowed to actually enter and use the site.

SUMMARY OF THE INVENTION

Accordingly, the present invention is directed to a system and method for verifying the age of an internet user that substantially obviates one or more problems due to limitations and disadvantages of the related art.

An embodiment of the present invention provides a system and method for securely validating and notifying an online service provider of the age of a prospective online user.

Additional features and advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

To achieve these and other advantages and in accordance with the purpose of the present invention, as embodied and broadly described, the system and method for verifying the age of an internet user includes a method of verifying the age of a prospective Internet user, the method comprising establishing an age check account; receiving information about a user, the information including an alleged age of the user; sending the information to be verified; and receiving a notification that the information has been verified.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EXEMPLARY EMBODIMENTS

Reference will now be made in detail to the embodiments of the present invention, examples of which are illustrated in the accompanying drawings.

In the following detailed description, numerous non-limiting specific details are set forth in order to assist in understanding the subject matter presented herein. It will be apparent, however, to one of ordinary skill in the art that various alternatives may be used without departing from the scope of the present invention and the subject matter may be practiced without these specific details. For example, it will be apparent to one of ordinary skill in the art that the subject matter presented herein can be implemented by any type of user (i.e., not limited to parent and child) and on any type of standalone system or client-server compatible system containing any type of client, network, server, and database elements. Wherever possible, like reference numbers will be used for like elements.

Figure 1:
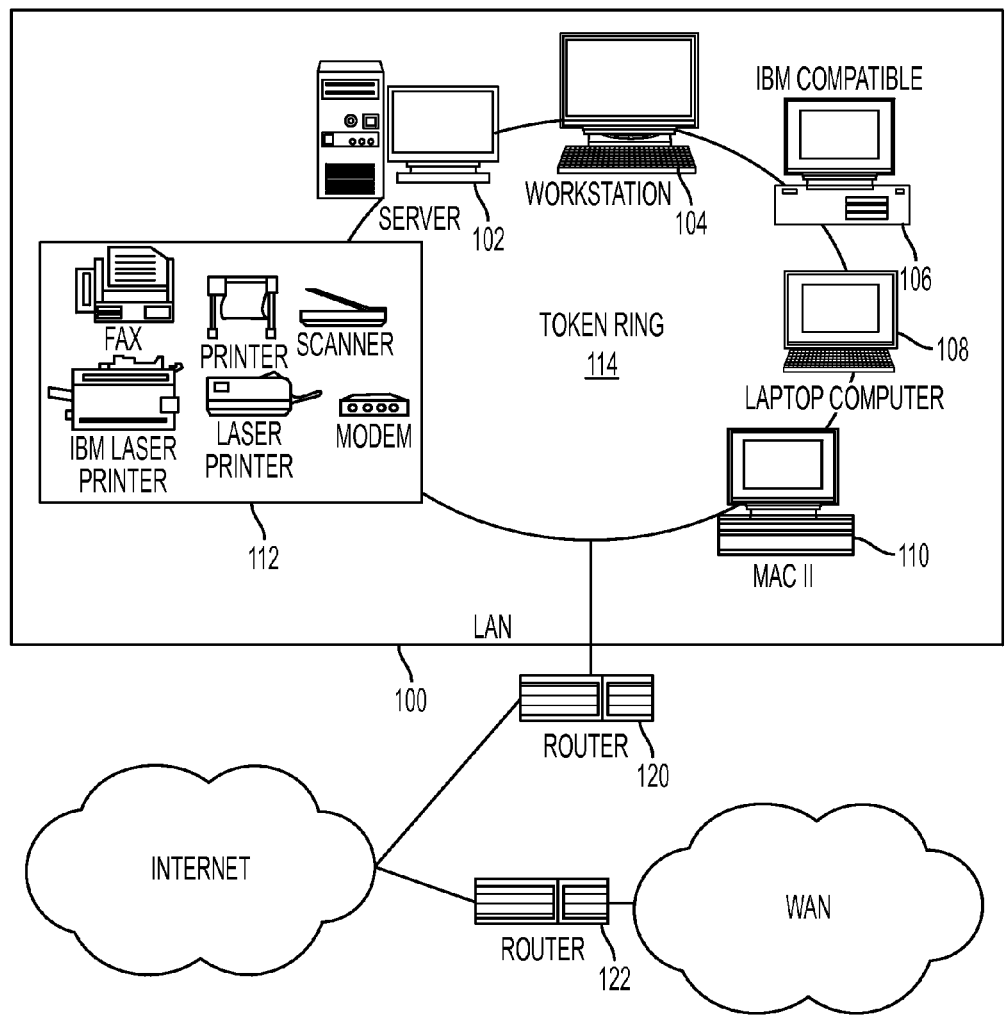
FIG. 1 illustrates an example of a local area network (LAN) 100 that is connected to the Internet and in which the inventive system method may be utilized.

FIG. 1 illustrates an example of a local area network (LAN) 100 that is connected to the Internet and in which the inventive system method may be utilized.

As shown in FIG. 1, a local area network (LAN) 100 comprises a server 102, four computer systems 104, 106, 108, 110, and peripherals, such as printers and other devices 112, that may be shared by components on LAN 100. Computer systems 104, 106, 108, 110 may serve as clients for server 102 and/or as clients and/or servers for each other and/or for other components connected to LAN 100. Components on LAN 100 are preferably connected together by cable media, for example unshielded twisted pair (UTP) Category 5 copper cable, and the network topology may be an Ethernet topology 114. It should be apparent to those of ordinary skill in the art that other media, for example, fiber optic or wireless radio frequency media, may also connect LAN 100 components. It should also be apparent that other network topologies, such as Token Ring, may be used.

Data may be transferred between components on LAN 100 in packets, i.e., blocks of data that are individually transmitted over LAN 100. Routers 120, 122 create an expanded network by connecting LAN 100 to other computer networks, such as the Internet, other LANs or Wide Area Networks (WAN). Routers are hardware devices that may include a conventional processor, memory, and separate I/O interface for each network to which it connects. Hence, components on the expanded network may share information and services with each other. In order for communications to occur between components of physically connected networks, all components on the expanded network and router 304s that connect them must adhere to a standard protocol. Computer networks connected to the Internet and to other networks typically use TCP/IP Layering Model Protocol. It should be noted that other internetworking protocols may be used.

Figure 2:
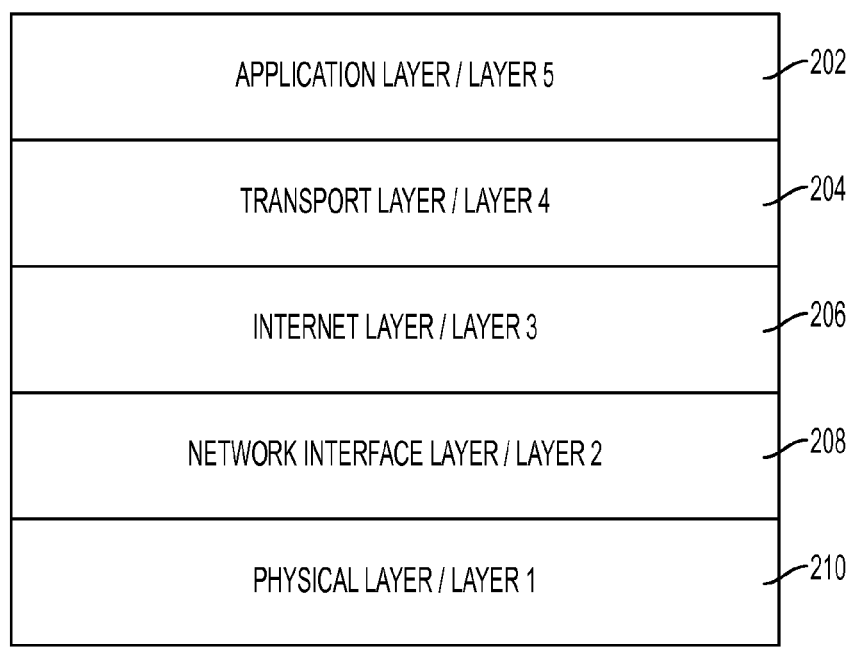
FIG. 2 illustrates the TCP/IP Layering Model in which the inventive system method may be utilized.

FIG. 2 illustrates the TCP/IP Layering Model in which the inventive system method may be utilized.

As shown in FIG. 2, the TCP/IP Layering Model includes an application layer (Layer 5) 202, a transport layer (Layer 4) 204, an Internet layer (Layer 3) 206, a network interface layer (Layer 2) 208, and a physical layer (Layer 1) 210. Application layer protocols 202 specify how each software application connected to the network uses the network. Transport layer protocols 204 specify how to ensure reliable transfer among complex protocols. Internet layer protocols 206 specify the format of packets sent across the network as well as mechanisms used to forward packets from a computer through one or more routers to a final destination. Network interface layer protocols 208 specify how to organize data into frames and how a computer transmits frames over the network. Physical layer protocols 210 correspond to the basic network hardware. By using TCP/IP Layering model protocols, any component connected to the network can communicate with any other component connected directly or indirectly to one of the attached networks.

Figure 3:
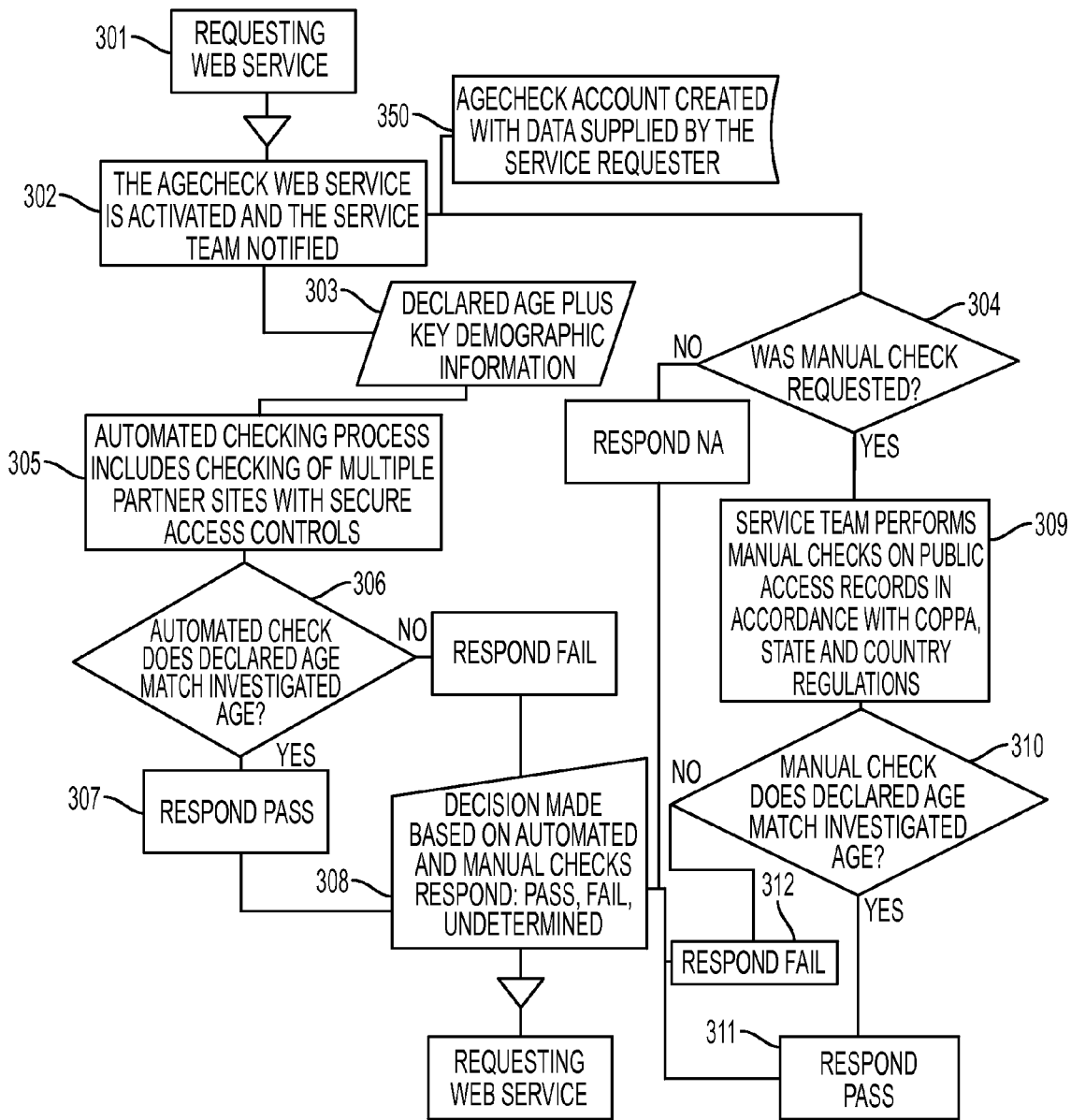
FIG. 3 illustrates an exemplary process flow in accordance with an exemplary embodiment of the present invention.

FIG. 3 illustrates an exemplary process flow in accordance with an exemplary embodiment of the present invention.

At step 301, a user logs onto a service requester (e.g., an Internet website or any other Internet based application) that requires verification of the user's age. For example, many social dating sites require that the user be over 18 years of age. Similarly, many websites where purchases can be made require that the user be over 18 years of age or require parental consent before purchases can be made.

Next, at step 302, a service requester sends a request with user information to the age check system to verify whether a user is of sufficient age to view, sign-up, or make purchases at a service requester. The age check system, an account for which was previously created, is activated through the service requester Internet website.

Service requesters may partner with the age check system by creating an account with the age check system. The account is created with data supplied by the service requester to the age check system. The data required to create an account may include the name, address and contact information for the service requestor as well as information about the type of business that the service requester is engaged in. It may also include payment details and notification details.

At step 303, the service requester requests that a user provide information regarding age, address, and other information that may be used by the service requester to ensure that a user may view, sign-up, or make purchases at a service requester. Some of the information may be desired for use by the service requester, and some of the information may be desired for use by the age check system. Accordingly, the information may be used by the service requester for a variety of purposes, and also may be sent to the age check system to verify a user's age.

The age check system may request many types of information including demographic information, such as full name, address, quoted age, form of government issued identification including passport or driving license number. The user inputs the information into a form provided by a service requester. Then, the information is sent to the age check system at step 303. Thus, all communication with a user is performed through the service requester such that the user is blind to the age check system.

At step 304, the service requester may request that the age check system perform a manual check of a user's inputted information. As shown in FIG. 3, if a manual check is requested, the age check service performs a manual check, which will be described later.

If no manual check is requested, the age check system performs an automated checking process at step 305. The process includes checking a user's input information with information from partner sites. The age check system has secure access to third party sites that also acquire information from users regarding age, address, etc. The age check system may obtain the information from the various partner sites to verify that the same user is inputting the same age and address information, and that all information can be validated, as shown at step 306. If the information between the age check system and third party system match, the user passes, at step 307. Accordingly, and the age check system recommends to a service requester that a user be allowed access to the service requester at step 308.

As discussed above, the service requester may request that the age check system perform a manual check of the user's inputted information at step 304. A manual request may be made if the service requester prefers a more thorough age verification procedure that includes manual checks. If a manual check is requested, the age check system may access public records that contain information about a prospective user to verify the age of a user at step 309. Such a manual check may be performed in compliance with COPPA, state, and country regulations.

At step 310, the manual check verifies that the input information is accurate, the user passes and the age check system recommends that the user be connected with the website at step 311. Alternatively, if the information acquired by the age check system does not match the info, illation input by the user, the check fails at step 312, and the age check service recommends to the service requester that the user be denied access to the website.

The age check system may aggregate all of the information that it obtains from a service requester, partner website, public record, or any other source for further use. If the service requester requires that the validations be stored, the age check system will store all information with a record of the user.

Figure 4:
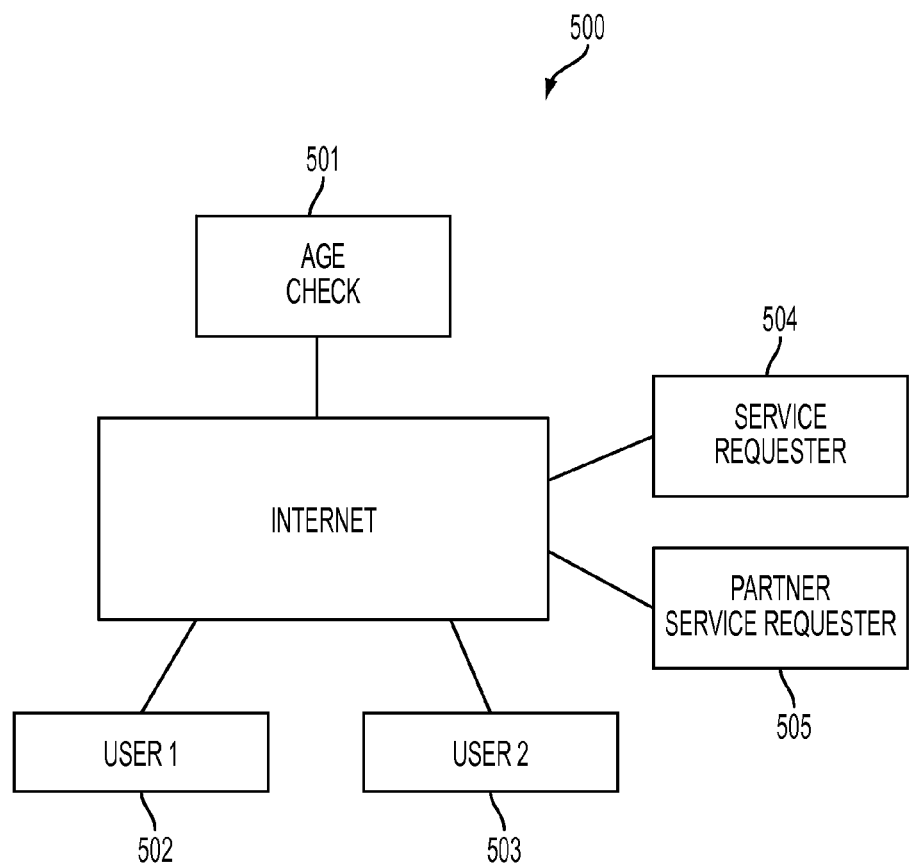
FIG. 4 illustrates an age check match system according to an exemplary embodiment of the present invention.

FIG. 4 illustrates an age check match system according to an exemplary embodiment of the present invention.

As shown in FIG. 4, the age check system 500 includes an age check server 501, one or more user computers 502 and 503, one or more service requesters 504, and one or more partner service requesters. The age check server 501 may include a persistent software system and service that provides a rapid secure checking mechanism to determine and/or validate a person's age before the person is allowed on a certain service requester. The age check system determines whether setup information that was supplied by a person is correct. The system provides an application programming interface (API) that exposes software functions that other websites, web services and Internet enabled desktop applications can use to enforce age checks when a person attempts to create an online account and/or gain access to an age-sensitive website. A service requester 504, such as a website, web service, Internet enabled desktop applications, or any Internet based application may partner with the present age check system, and a service requester account may be established with the age check system. Each of the user computers 502 and 503 may be a desktop computer, laptop computer, tablet or portable computer, smartphone, mobile phone, or other portable computing device. Service requester 504 may include any Internet based application, such as a website, web application, or an Internet enabled desktop application, etc. Similarly, a partner service requester may include any Internet based application, such as a website, web application, or an Internet enabled desktop application, etc.

It will be apparent to those skilled in the art that various modifications and variations can be made in the system and method for verifying the age of an internet user of the present invention without departing from the spirit or scope of the invention. Thus, it is intended that the present invention cover the modifications and variations of this invention provided they come within the scope of the appended claims and their equivalents.

What is claimed is:

1. A method of verifying the age of a prospective Internet user, comprising a non-transitory computer readable medium including a program and a computer executable program code, the method comprising:
    establishing, by a user at a user client computer, an age check account in an alleged identity and age server computer, said age server computer comprising a first database,
    the account established by receiving information from a user operating a service requester client computer via an Internet application, the information including an alleged age of the user;
    storing the information in the first database in the alleged identity and age server computer;
    requesting information from a partner requester client computer, the partner requester client computer comprising a second database, the second database including information about the user, the information being previously provided by the user;
    comparing the user information in the alleged identity and age server computer comprising the first database with information received from the partner service requester client computer comprising the second database;
    the comparison verifying that information previously provided by the user, from the partner service requester, corresponds to the information from the service requester client computer, including the alleged age of the user;
    sending a notification to the service requester from the age check system that the alleged age of the user has been verified; and
    the service requester requiring aggregation, in the first database, of the information from the partner requester client computer with the information in the alleged identity and age server computer, including the alleged age of the user,
    wherein the information from the service requester is received by the alleged identity and age database through an application programming interface accessed by the user via the Internet application, and
    wherein verification further comprises verifying the information manually by comparing against public records.

2. The method of verifying the age of a prospective Internet user according to claim 1, wherein the service requester establishes the age check account with an Internet-accessible age check system.

3. The method of verifying the age of a prospective Internet user according to claim 1, wherein the information includes demographic information.

4. The method of verifying the age of a prospective Internet user according to claim 1, wherein the step of sending the information to be verified is performed automatically.

5. The method of verifying the age of a prospective Internet user according to claim 1, wherein the notification is either a pass or fail notification.

6. The method of verifying the age of a prospective Internet user according to claim 1, further comprising the aggregating the information of a plurality of users.

7. The method of verifying the age of a prospective Internet user according to claim 1, wherein the information from the user is sent via a mobile telephone.

8. The method of verifying the age of a prospective Internet user according to claim 1, further comprising establishing an information comparison database, the information comparison database including information about a particular user accumulated from a plurality of partner service requester databases and public records.

9. The method of verifying the age of a prospective Internet user according to claim 8, wherein the information comparison database is updated for each user each time the information about the particular user is received from the plurality of partner service requester databases.

10. The method of verifying the age of a prospective Internet user according to claim 1, wherein the user's alleged age is stored in a database of the service requestor.

* * * * *